(12) United States Patent
Cabrera et al.

(10) Patent No.: US 10,344,841 B1
(45) Date of Patent: Jul. 9, 2019

(54) WRENCH ROTATIONAL AXIS RE-POSITIONING APPARATUS

(71) Applicants: Luis Cabrera, Hialeah, FL (US); Ernesto Valladares, Lake Worth, FL (US)

(72) Inventors: Luis Cabrera, Hialeah, FL (US); Ernesto Valladares, Lake Worth, FL (US)

(73) Assignee: E-Z FAST RATCHET WRENCH, LLC, Lake Worth, FL (US)

( * ) Notice: Subject to any disclaimer, the term of this patent is extended or adjusted under 35 U.S.C. 154(b) by 0 days.

(21) Appl. No.: 15/805,344

(22) Filed: Nov. 7, 2017

(51) Int. Cl.
*F16H 31/00* (2006.01)
*B25B 13/46* (2006.01)
*B25B 23/00* (2006.01)
*B25B 13/48* (2006.01)

(52) U.S. Cl.
CPC .......... *F16H 31/002* (2013.01); *B25B 13/463* (2013.01); *B25B 13/467* (2013.01); *B25B 13/481* (2013.01); *B25B 23/0007* (2013.01)

(58) Field of Classification Search
CPC ...... B25B 13/467; B25B 17/00; B25B 13/463
USPC .................................................. 81/57.29, 62
See application file for complete search history.

(56) References Cited

U.S. PATENT DOCUMENTS

| | | | | |
|---|---|---|---|---|
| 2,703,030 A * | 3/1955 | Marvin | ............... | B25B 13/463 81/57.29 |
| 2,803,980 A * | 8/1957 | Vogel | ............... | B25B 13/463 81/62 |
| 3,332,295 A * | 7/1967 | Cummings, Jr. | ..... | B25B 13/463 81/62 |
| 3,733,936 A * | 5/1973 | Flynn | ............... | B25B 13/467 81/57.29 |
| 4,311,072 A * | 1/1982 | Hudgins | ............... | B25B 17/00 81/57.29 |
| 4,532,832 A * | 8/1985 | Christensen | ............ | B25B 13/467 81/57.29 |
| 4,592,256 A * | 6/1986 | Bosque | ............... | B25B 17/00 81/57.29 |
| 4,699,028 A * | 10/1987 | Bosque | ............... | B25B 13/467 81/57.29 |
| 6,009,776 A * | 1/2000 | Warren | ............... | B25B 13/467 81/57.29 |

(Continued)

*Primary Examiner* — Victor L MacArthur
(74) *Attorney, Agent, or Firm* — Glenn E. Gold; Glenn E. Gold, P.A.

(57) ABSTRACT

A wrench rotational axis re-positioning apparatus includes a housing, an interior cavity defined in the housing, input and output gear assemblies mounted to the housing and disposed in the interior cavity in a meshing contact with one another and rotatable about respective first and second axes arranged in a right angle configuration with one another, the input and output gear assemblies having respective input and output fittings for connection to respective drive and driven devices, and a ratcheting mechanism mounted to the housing and extending from exterior thereof into the interior cavity such that the ratcheting mechanism is presettable in either one of first and second orientations relative to the output gear assembly to enable the latter to correspondingly rotate in one or the other opposite direction about the second axis in response to the input gear assembly being rotated in either opposite direction about the first axis.

8 Claims, 12 Drawing Sheets

(56) References Cited

U.S. PATENT DOCUMENTS

| | | | | |
|---|---|---|---|---|
| 6,047,616 | A | * | 4/2000 | Ochiai ................. B25B 13/467 81/57.29 |
| 6,112,621 | A | * | 9/2000 | Ochiai .................... B25B 17/00 81/57.29 |
| 8,707,816 | B2 | * | 4/2014 | Adkins ................. B23B 45/003 74/416 |
| 2003/0145687 | A1 | * | 8/2003 | Lin ....................... B25B 13/463 81/57.29 |

* cited by examiner

WRENCH ROTATIONAL AXIS RE-POSITIONING APPARATUS

FIELD OF THE INVENTION

The present invention relates to hand took, and, more particularly, is concerned with a wrench rotational axis re-positioning apparatus.

BACKGROUND OF THE INVENTION

A conventional ratcheting socket wrench is constructed to permit turning a socket to loosen, tighten or free a bolt or nut without removing the socket from the bolt or nut. Typically, a ratcheting mechanism is incorporated in the wrench to permit the handle of the wrench to be moved repetitively in opposite, force imparting and non-force imparting, directions through a limited arc about the axis of the socket to make the socket turn in only the force imparting direction.

However, moving the handle of the ratcheting socket wrench in the opposite directions requires an adequate working space for imparting sufficient force or torque to the bolt or nut for it to be loosened, tightened or freed. Oftentimes, the bolt or nut is located in a confined or limited space, such as inside a hollow elongated cylinder or between two spaced walls of adjacent housings or casings. Lack of adequate working space makes it difficult or impossible to reach the location of the bolt or nut or to be able to effect sufficient rotational movement of the handle of the wrench to effect loosening, tightening or freeing of the bolt or nut.

Accordingly, there is a long-felt but, as-of-yet, unmet need in the art for an innovation that will overcome deficiencies of the known past art and the problems that may still be unsolved.

SUMMARY OF THE INVENTION

The present invention is directed to an innovation providing a wrench rotational axis re-positioning apparatus that overcomes the deficiencies of known past art and the problems that remain unsolved.

In one aspect of the present invention, a wrench rotational axis re-positioning apparatus includes:
a housing;
an interior cavity defined in the housing;
a pair of input and output gear assemblies mounted to the housing and disposed in the interior cavity in a meshing contact with one another and rotatable about respective first and second axes arranged in a right angle configuration with one another, the input and output gear assemblies having respective input and output fittings extending from the interior cavity to exterior of the housing for connection to respective drive and driven devices; and
a ratcheting mechanism mounted to the housing and disposed within the interior cavity thereof, the ratcheting mechanism having an actuating lever extending to exterior of the housing from the interior cavity thereof such that by manipulation of the actuating lever the ratcheting mechanism is presettable in either one or the other of first and second orientations relative to the output gear assembly to enable the output gear assembly to correspondingly rotate in one or the other of opposite directions about the second axis in response to the input gear assembly being rotated in either of the opposite directions about the first axis.

In another aspect of the present invention, the input gear assembly includes:
an input shaft mounted to and extending between opposite sides of the housing through the interior cavity thereof and being rotatable about the first axis, the input shaft having the input fitting with a female portion disposed at an end of the input shaft exterior of the housing; and
an input gear affixed to the input shaft and disposed within the interior cavity, the input gear being rotatable with the input shaft about the first axis.

In another aspect of the present invention, the output gear assembly includes:
an output shaft mounted to and extending between the opposite sides of the housing through the interior cavity thereof and being rotatable about the second axis, the output shaft having the output fitting with a male portion disposed at an end of the output shaft exterior of the housing; and
an output gear affixed to the output shaft and disposed within the interior cavity at a right angle to the input gear and in the meshing contact therewith, the output gear being rotatable with the output shaft about the second axis.

In another aspect of the present invention, the ratcheting mechanism includes:
a ratchet gear affixed to the output gear assembly and being rotatable therewith about the second axis, the ratchet gear having an endless peripheral row of teeth projecting outward with respect to the second axis;
a pair of spaced apart pawls having respective first ends engageable with the endless peripheral row of teeth of the ratchet gear and respective second ends pivotally mounted to the housing remote from the ratchet gear to enable pivotal movement of the pawls into and out of engagement with the endless peripheral row of teeth of the ratchet gear such that the first ends of the pawls when engaged therewith prevent rotation of the ratchet gear and the output gear assembly therewith in the one of the opposite directions and allow rotation of the ratchet gear and the output gear assembly therewith in the other of the opposite directions; and
a pair of springs each extending between a respective one of the pawls and a respective one of opposite locations on the housing so as to bias the pawls toward engagement of the first ends thereof with the endless peripheral row of teeth of the ratchet gear;
wherein the actuating lever is pivotally mounted at one end thereof to the housing and has a cam element proximate the one end being located within the interior cavity of the housing between and in contact with the pawls between the first and second ends thereof, and wherein the actuating lever at an opposite end thereof extends from the interior cavity to exterior of the housing so as to enable manipulation of the actuating lever to pivot the cam element and thereby pivotally move the pawls to one or the other of the first and second orientations such that only one or the other of the pawls at the first end thereof engages the endless row of teeth of the ratchet gear.

In another aspect of the present invention, a wrench rotational axis re-positioning apparatus includes:
a housing;
an interior cavity defined in the housing;
an input gear assembly including
an input shaft mounted to and extending between opposite sides of the housing through the interior cavity thereof and being rotatable about a first axis, the input shaft having an input fitting extending from the interior cavity to exterior of the housing for connection to a drive device, the input fitting having a female portion disposed at an end of the input shaft exterior of the housing, and an input bevel gear affixed to the input shaft and disposed within the interior cavity, the input bevel gear being rotatable with the input shaft about the first axis;

an output gear assembly including an output shaft mounted to and extending between the opposite sides of the housing through the interior cavity thereof and being rotatable about a second axis, the output shaft having an output fitting extending from the interior cavity to exterior of the housing for connection to a driven device, the output fitting having a male portion disposed at an end of the output shaft exterior of the housing, and an output bevel gear affixed to the output shaft and disposed within the interior cavity at a right angle to the input bevel gear and in a meshing contact therewith, the output bevel gear being rotatable with the output shaft about the second axis extending at a right angle with the first axis; and a ratcheting mechanism mounted to the housing and disposed within the interior cavity thereof, the ratcheting mechanism having an actuating lever extending to exterior of the housing from the interior cavity thereof such that by manipulation of the actuating lever the ratcheting mechanism is presettable into either one or the other of first and second orientations relative to the output gear assembly to enable the output gear assembly to correspondingly rotate in one or the other of opposite directions about the second axis in response to the input gear assembly being rotated in either of the opposite directions about the first axis.

In another aspect of the present invention, the input bevel gear of the input gear assembly is larger in diameter than the output bevel gear of the output gear assembly to cause rotation of the output bevel gear at a greater speed than the input bevel gear.

In another aspect of the present invention, a wrench rotational axis re-positioning apparatus includes:

a housing having first and second housing portions formed at a right angle with respect to one another and being rigidly connected to one another at adjacent parts thereof;

an interior cavity defined in the housing having first and second cavity portions formed at a right angle with respect to one another and an opening between the first and second cavity portions at the rigidly-connected adjacent parts of the first and second housing portions;

an input gear assembly including an input shaft mounted to and extending between opposite sides of the housing through the interior cavity thereof and being rotatable about a first axis, the input shaft having an input fitting extending from the interior cavity to exterior of the housing for connection to a drive device, the input fitting having a female portion disposed at an end of the input shaft exterior of the housing, and an input bevel gear affixed to the input shaft and disposed within the interior cavity; the input bevel gear being rotatable with the input shaft about the first axis;

an output gear assembly including an output shaft mounted to and extending between the opposite sides of the housing through the interior cavity thereof and being rotatable about a second axis, the output shaft having an output fitting extending from the interior cavity to exterior of the housing for connection to a driven device, the output fitting having a male portion disposed at an end of the output shaft exterior of the housing, and an output bevel gear affixed to the output shaft and disposed within the interior cavity at a right angle to the input bevel gear and in a meshing contact therewith, the output bevel gear being rotatable with the output shaft about the second axis extending at a right angle with the first axis; and a ratcheting mechanism mounted to the housing and disposed within the interior cavity thereof, the ratcheting mechanism having an actuating lever extending to exterior of the housing from the interior cavity thereof such that by manipulation of the actuating lever the ratcheting mechanism is presettable into either one or the other of first and second orientations relative to the output gear assembly to enable the output gear assembly to correspondingly rotate in one or the other of opposite directions about the second axis in response to the input gear assembly being rotated in either of the opposite directions about the first axis, the ratcheting mechanism including a ratchet gear affixed to the output shaft adjacent to the output bevel gear and being rotatable with the output shaft and output bevel gear about the second axis, the ratchet gear having an endless peripheral row of teeth projecting outward with respect to the second axis, a pair of spaced apart pawls having respective first ends engageable with the endless peripheral row of teeth of the ratchet gear and respective second ends pivotally mounted to the housing remote from the ratchet gear to enable pivotal movement of the pawls into and out of engagement with the endless peripheral row of teeth of the ratchet gear such that the first ends of the pawls when engaged therewith prevent rotation of the ratchet gear and the output shaft and output bevel gear therewith in the one of the opposite directions and allow rotation of the ratchet gear and the output shaft and output bevel gear therewith in the other of the opposite directions, and a pair of springs each extending between a respective one of the pawls and a respective one of opposite locations on the housing so as to bias the pawls toward engagement of the first ends thereof with the endless peripheral row of teeth of the ratchet gear, wherein the actuating lever is pivotally mounted at one end thereof to the housing and has a cam element proximate the one end being located within the interior cavity of the housing between and in contact with the pawls between the first and second ends thereof, and wherein the actuating lever at an opposite end thereof extends from the interior cavity to exterior of the housing so as to enable the manipulation of the actuating lever to pivot the cam element and thereby pivotally move the pawls to one or the other of the first and second orientations such that only one or the other of the pawls at the first end thereof engages the endless peripheral row of teeth of the ratchet gear.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
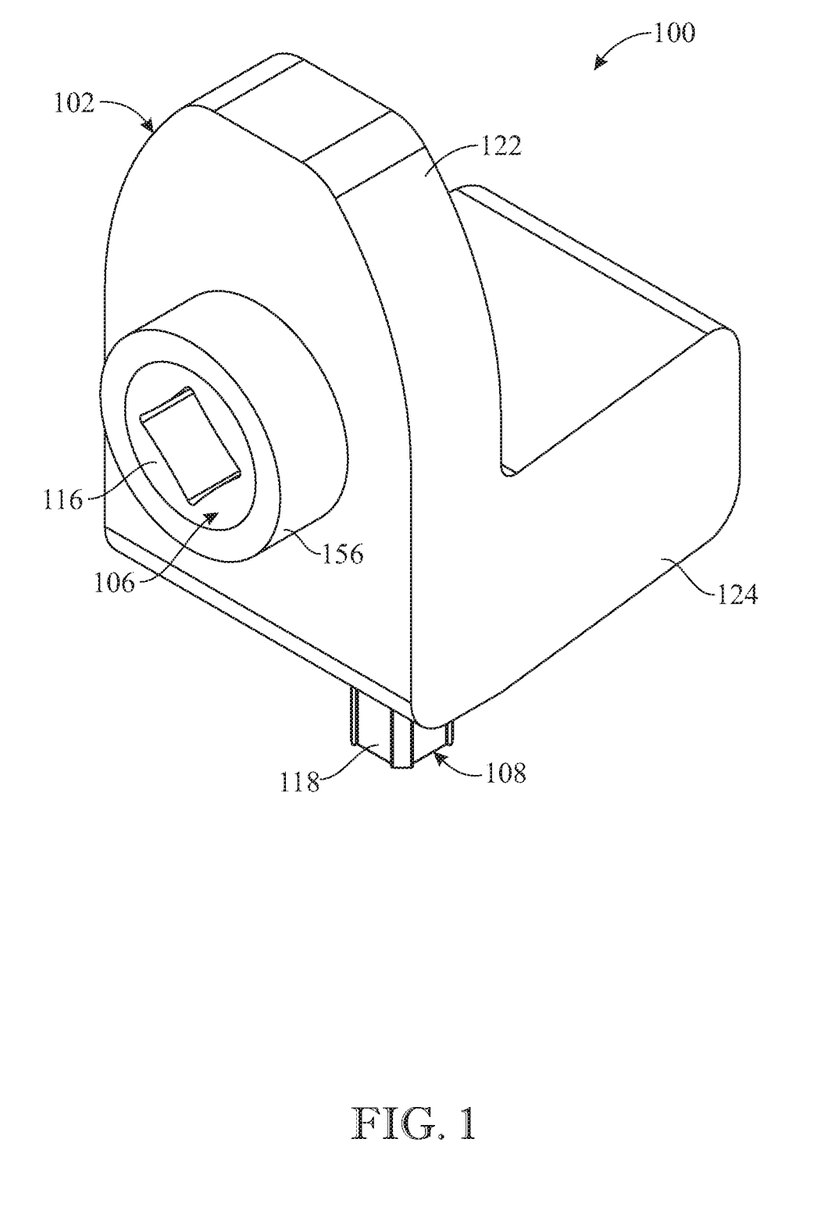
FIG. 1 presents an upper front isometric view of an exemplary embodiment of a wrench rotational axis re-positioning apparatus in accordance with aspects of the present invention.
Figure 2:
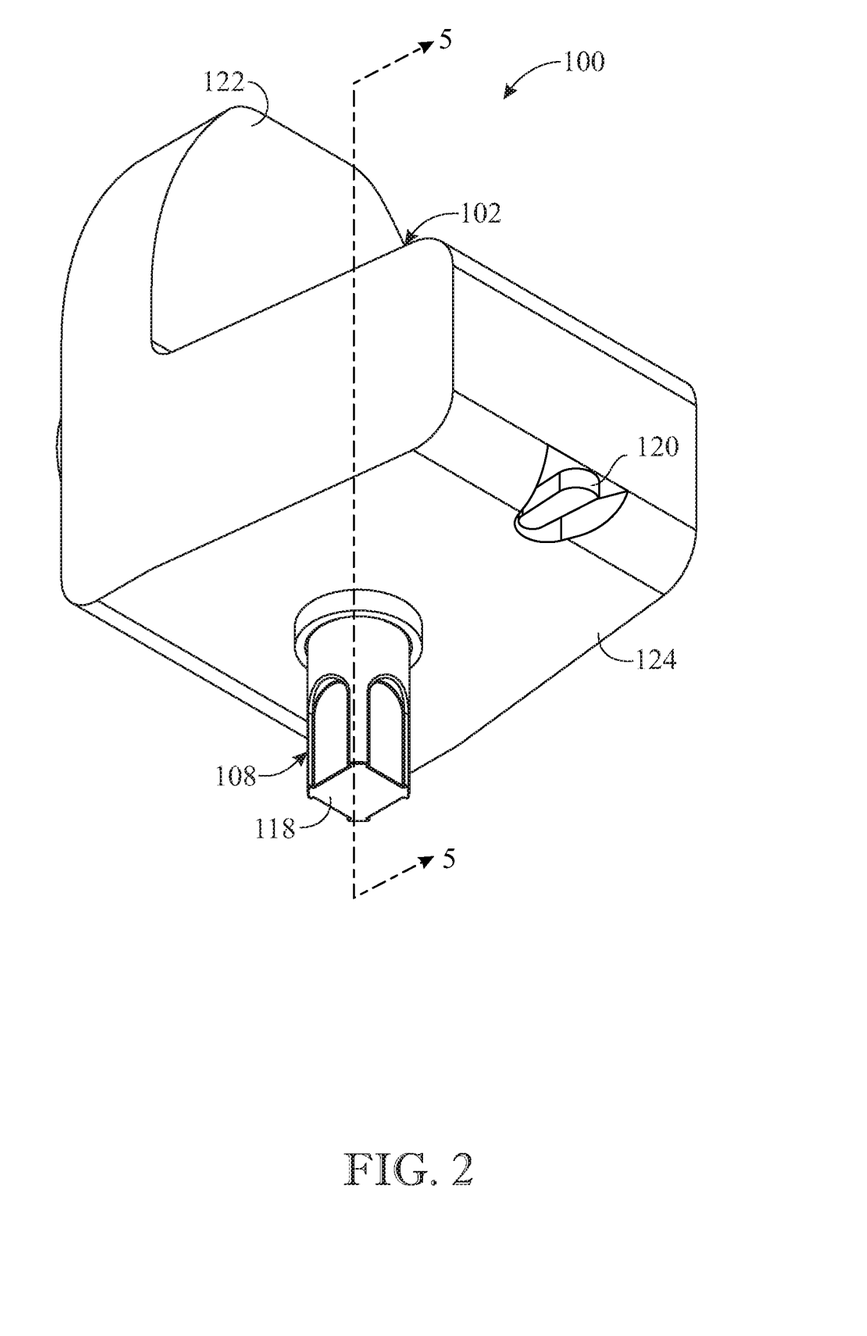
FIG. 2 presents a lower rear isometric view of the apparatus originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-3, 3A, 4, 4A, 5 and 10, there is illustrated an exemplary embodiment of a wrench rotational axis re-positioning apparatus, generally designated 100, in accordance with aspects of the present invention. The apparatus 100 generally includes a housing 102, an interior cavity 104, a pair of input and output gear assemblies 106, 108, and a ratcheting mechanism 110. The interior cavity 104 is defined in the housing 102. The input and output gear assemblies 106, 108 are mounted to the housing 102 and disposed in the interior cavity 104. The input and output gear assembles 106, 108 are in a meshing contact with one another and rotatable about respective first and second axes 112, 114 arranged in a right angle configuration with one another. The input and output gear assemblies 106, 108 have respective input and output fittings 116, 118 extending from the interior cavity 104 to exterior of the housing 102 for connection to respective drive and driven devices (to be described hereinafter with reference to FIGS. 6-9). The ratcheting mechanism 110 is mounted to the housing 102 and disposed within its interior cavity 104. The ratcheting mechanism 110 has an actuating lever 120 extending to exterior of the housing 102 from its interior cavity 104. By manipulation of the actuating lever 120, the ratcheting mechanism 110 is presettable in either one or the other of first and second orientations relative to the output gear assembly 108 to enable the output gear assembly 108 to correspondingly rotate in one or the other of opposite directions about the second axis 114 in response to the input gear assembly 106 being rotated in either of the opposite directions about the first axis 112.

More particularly, the housing 102 has first and second housing portions 122, 124 formed at a right angle with respect to one another and being rigidly connected to one another at adjacent parts 126, 128 thereof. The interior cavity 104 in the housing 102 has first and second cavity portions 130, 132 formed at a right angle with respect to one another and an opening 134 between the first and second cavity portions at the rigidly-connected adjacent parts 126, 128 of the first and second housing portions 122, 124. Opposite front and back sides 136, 138 are defined by the first housing portion 122 and opposite top and bottom sides 140, 142 are defined by the second housing portion 124 and enclose the first and second cavity portions 130, 132 of the interior cavity 104.

Figure 3:
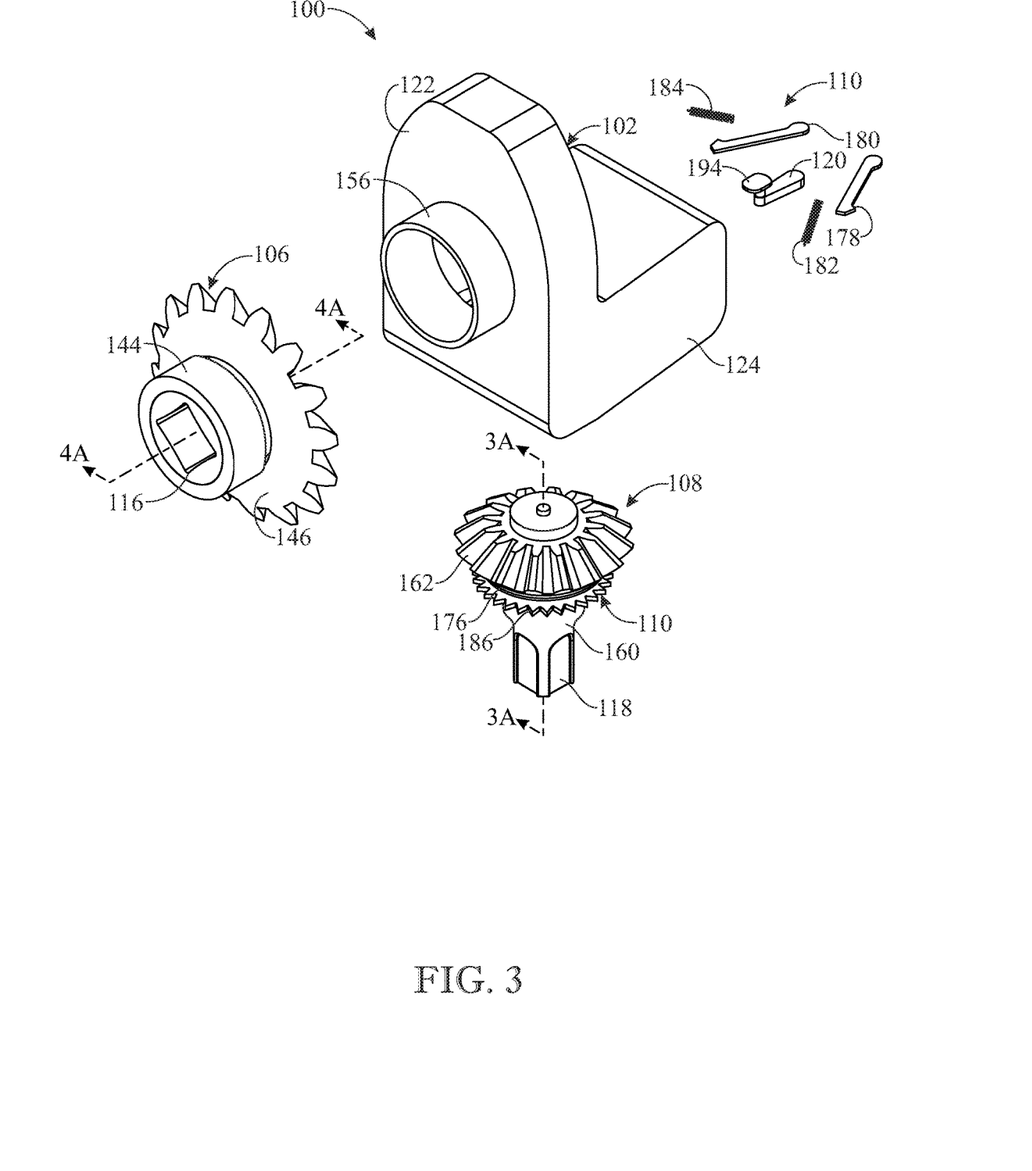
FIG. 3 presents an upper front isometric exploded view of the apparatus on a smaller scale than originally introduced in FIG. 1.
Figure 4:
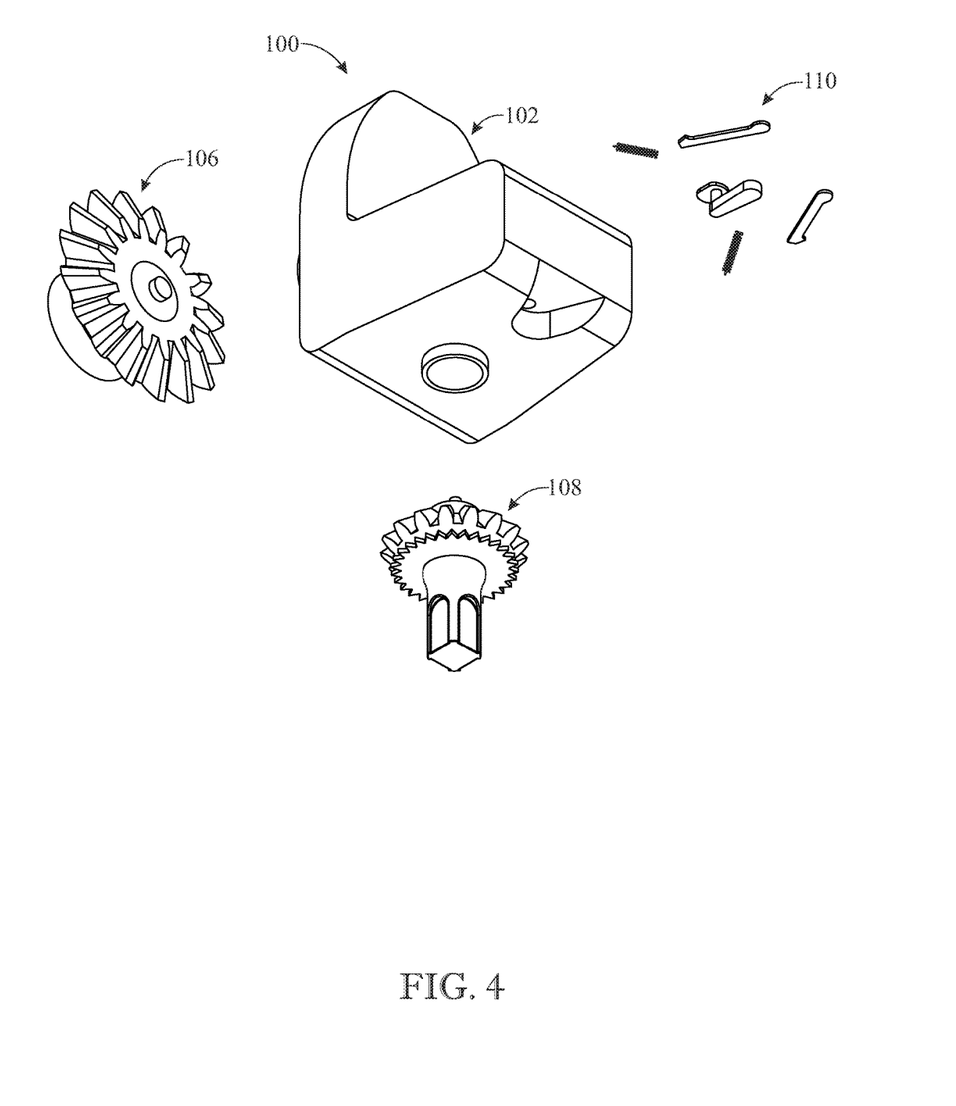
FIG. 4 presents a lower rear isometric exploded view of the apparatus on a smaller scale than originally introduced in FIG. 2.
Figure 4A:
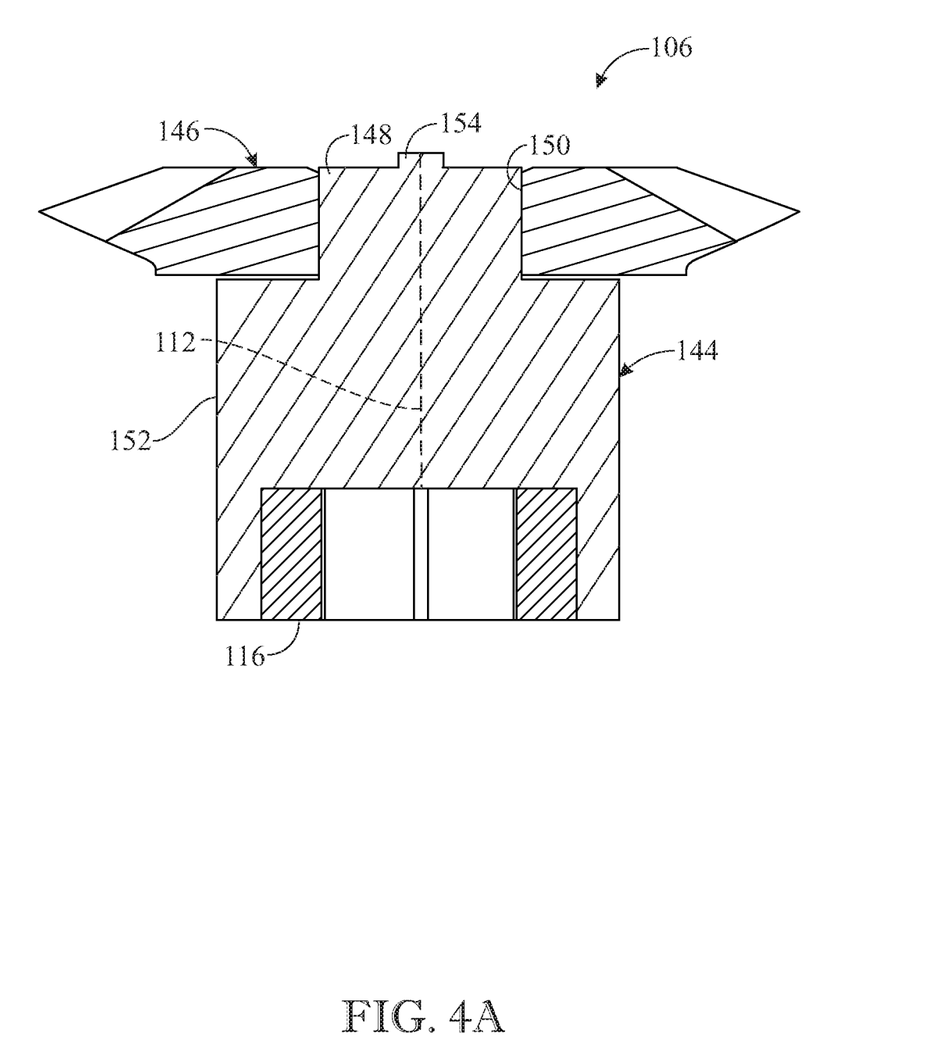
FIG. 4A presents on an enlarged sectional view of an input gear assembly of the apparatus taken along section line 4A-4A in FIG. 3 through a rotational axis of the input gear assembly.
Figure 5:
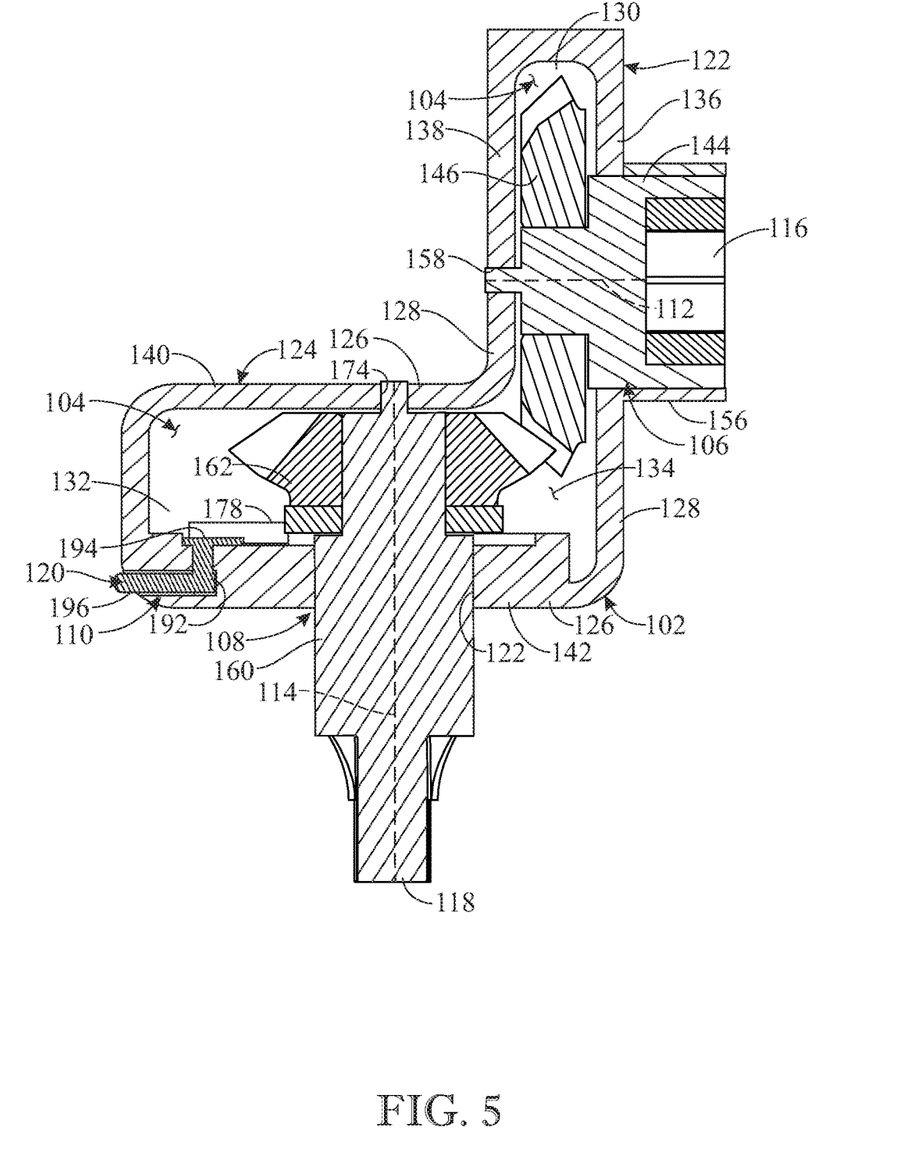
FIG. 5 presents a sectional view of the apparatus taken along section line 5-5 in FIG. 2 through rotational axes of the output and input gear assemblies of the apparatus, also illustrating a ratcheting mechanism incorporated by the apparatus adjacent to the output gear assembly.

The input gear assembly 106 includes an input shaft 144 and an input gear, preferably a bevel gear 146. The input shaft 144 is mounted to and extends between the opposite front and back sides 136, 138 of the first housing portion 122 through the first cavity portion 130 of the interior cavity 104. The input shaft 144 has a cylindrical middle portion 148 of a predetermined diameter about which the input bevel gear 146 through its central bore 150 is securely fitted and affixed. The input shaft 144 also has cylindrical front and rear end portions 152, 154 of larger and smaller diameters than the cylindrical middle portion 148. The cylindrical front end portion 152 of the input shaft 144 closely fits through and is rotatable relative to a hollow cylindrical bearing 156 affixed upon and protruding from the front side 136 of the housing 102. The cylindrical rear end portion 154 of the input shaft 144 closely fits through and is rotatable relative to a circular opening 158 formed in the back side 138 of the housing 102. The input bevel gear 146 is thereby affixed to the input shaft 144 and disposed within the first cavity portion 130 of the interior cavity 104 such that the input bevel gear 146, together with the input shaft 144, will rotate about the first axis 112. Also, the input shaft 144 has the input fitting 116 defined in a female configuration at an end of the input shaft protruding from the exterior of the first housing portion 122 of the housing 102.

Figure 3A:
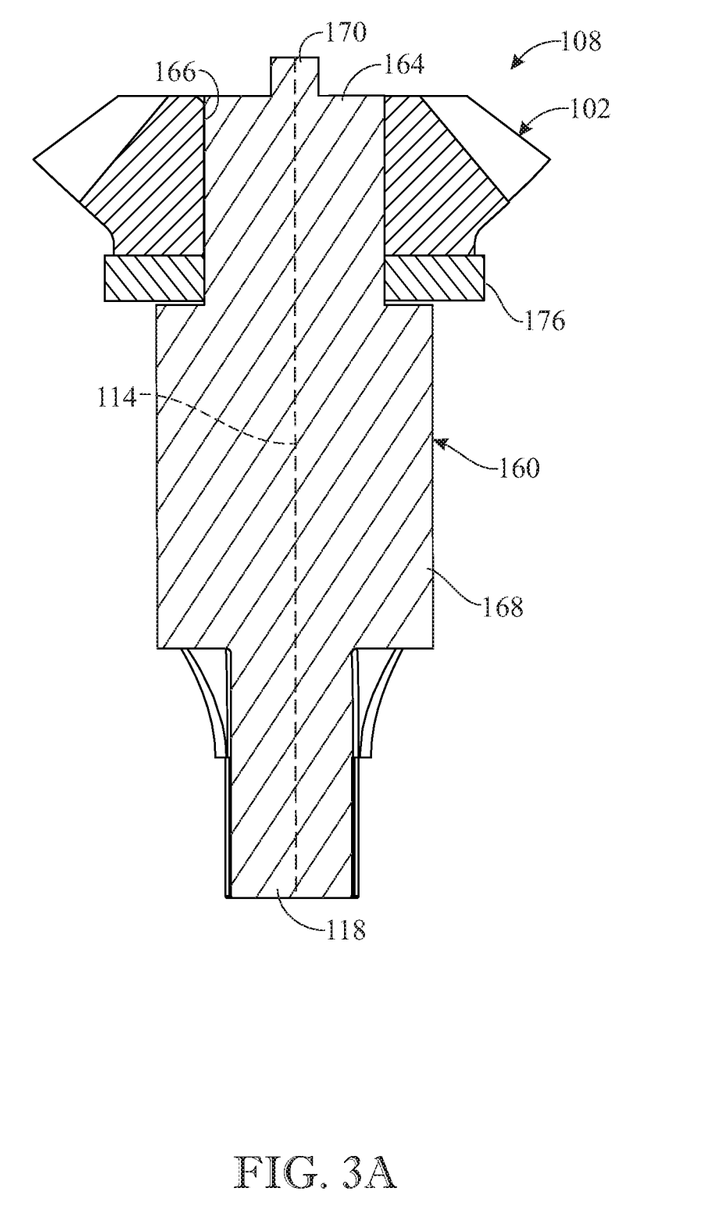
FIG. 3A presents an enlarged sectional view of an output gear assembly of the apparatus taken along section line 3A-3A in FIG. 3 through a rotational axis of the output gear assembly.

The output gear assembly 108 includes an output shaft 160 and an output gear, preferably a bevel gear 162. The output shaft 160 is mounted to and extends between the opposite top and bottom sides 140, 142 of the second housing portion 124 through the second cavity portion 132 of the interior cavity 104. The output shaft 160 has a cylindrical middle portion 164 of a predetermined diameter about which the output bevel gear 162 through its central bore 166 is securely fitted and affixed. The output shaft 160 also has cylindrical bottom and top end portions 168, 170 respectively of larger and smaller diameters than the cylindrical middle portion 164. The cylindrical bottom end portion 168 of the output shaft 160 closely fits through and is rotatable relative to a cylindrical bore 172 formed in the bottom side 142 of the housing 102. The cylindrical top end portion 170 of the output shaft 160 closely fits through and is rotatable relative to a circular opening 174 formed in the top side 140 of the housing 102. The output bevel gear 162 is thereby affixed to the output shaft 160 and disposed within the second cavity portion 132 of the interior cavity 104 such that the output bevel gear 162, together with the output shaft 160, will rotate about the second axis 114. The input and output bevel gears 146, 162 are arranged in a right angle configuration and a meshing contact with one another at the opening 134 between the first and second cavity portions 130, 132 of the interior cavity 104. Also, the output shaft 160 has the output fitting 118 defined in a male configuration at an end of the output shaft protruding from the exterior of the second housing portion 124 of the housing 102. The input bevel gear 146 of the input gear assembly 106 may be larger in diameter than the output bevel gear 162 of the output gear assembly 108 to cause rotation of the output bevel gear at a greater speed than, or by a multiplication function times, the speed of the input bevel gear.

Referring now to FIGS. 3, 3A, 4, 5 and 10, the ratcheting mechanism 110, in addition to the actuating lever 120, includes a ratchet gear 176, a pair of spaced apart pawls 178, 180, and a pair of springs, such as coil springs 182, 184. The ratchet gear 176 is affixed to the output gear assembly 108 about the cylindrical middle portion 164 of the output shaft 160 and disposed between the output bevel gear 162 and the cylindrical bottom end portion 168 of the output shaft. The ratchet gear 176 is rotatable with the output shaft 160 about the second axis 114. The ratchet gear 176 also has an endless peripheral row of teeth 186 projecting outward with respect to the second axis 114.

Figure 10:
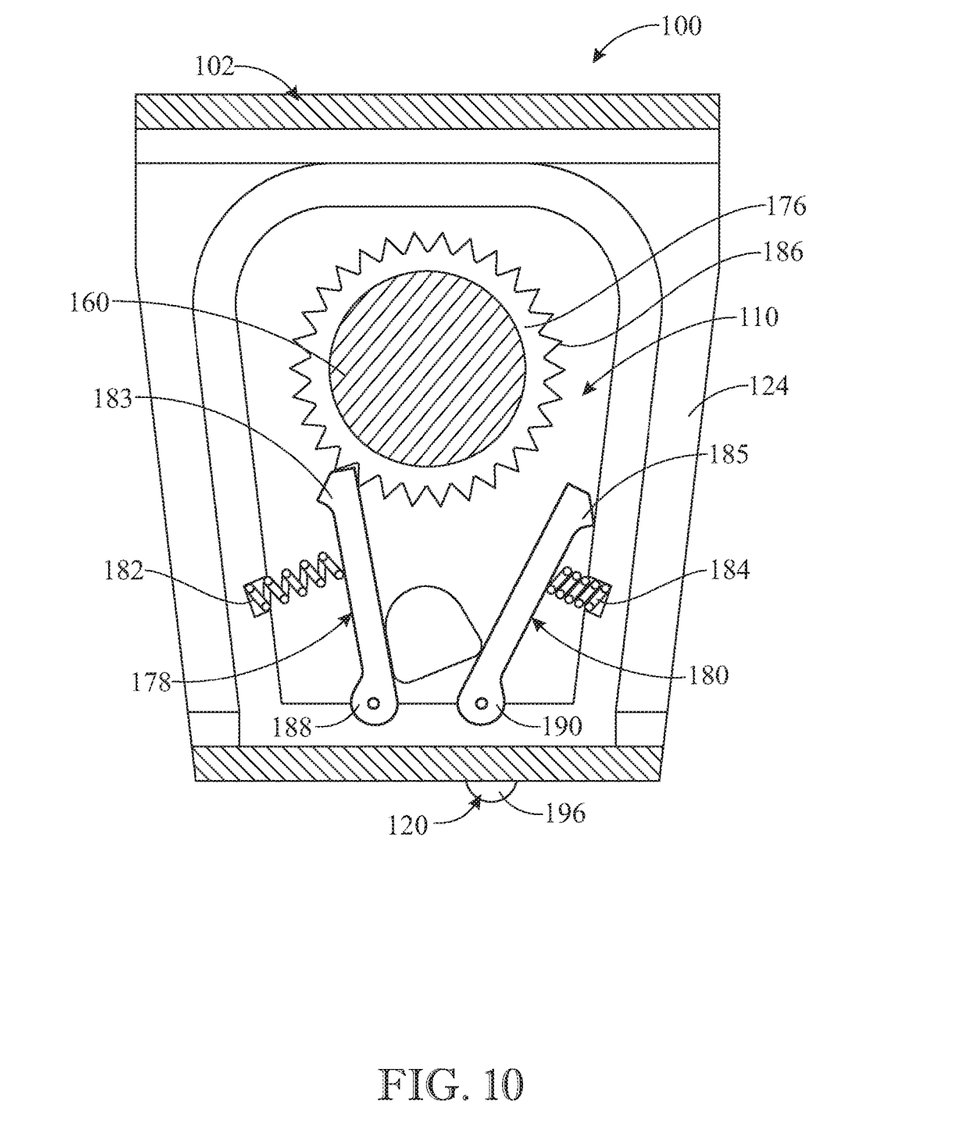
FIG. 10 presents on an enlarged fragmentary view of the apparatus illustrating the ratcheting mechanism thereof which is shown in an exploded form in each of FIGS. 3 and 4 and an assembled form in FIG. 5.

The pawls 178, 180 at respective first ends 182, 184 thereof are engageable with the endless peripheral row of teeth 186 of the ratchet gear 176. Also, the pawls 178, 180 at respective second ends 188, 190 thereof are pivotally mounted to the interior of the bottom side 142 of the housing 102 remote from the ratchet gear 176. The pivotal mounting of the respective pawls 178, 180 at their second ends 188, 190 enable pivotal movement thereof into and out of engagement with the endless peripheral row of teeth 186 of the ratchet gear. The first ends 182, 184 of the pivotal pawls 178, 180 when so engaged prevent rotation of the ratchet gear 176 and output gear assembly 108 therewith in the one of the opposite directions about the second axis 114 and allow rotation of the ratchet gear and output gear assembly therewith in the other of the opposite directions.

The coil springs 182, 184 each extend between a respective one of the pawls 178, 180 and a respective one of opposite locations on the housing 102 so as to bias the pawls toward engagement of their first ends 183, 185 with the endless peripheral row of teeth 186 of the ratchet gear 176. The actuating lever 120 is pivotally mounted at one end 192 thereof to the housing 102 and has a cam element 194 proximate the one end being located within the interior cavity 104 of the housing 102 between and in contact with the pawls 178, 180 between the first and second ends 183, 185 and 188, 190 thereof. The actuating lever 120 at an opposite end 196 thereof extends from the interior cavity 104 to the exterior of the housing 102 so as to enable the manipulation of the actuating lever to pivot the cam element 194 and thereby pivotally move the pawls 178, 180 to one or the other of the first and second orientations such that only one or the other of the pawls at their first ends 183, 185 engage the endless peripheral row of teeth 186 of the ratchet gear 176. In the first orientation seen in FIG. 10, the one pawl 178 engages the teeth 186 while the other paw 180 does not. The second orientation of the pawls 178, 180 is the opposite.

Figure 6:
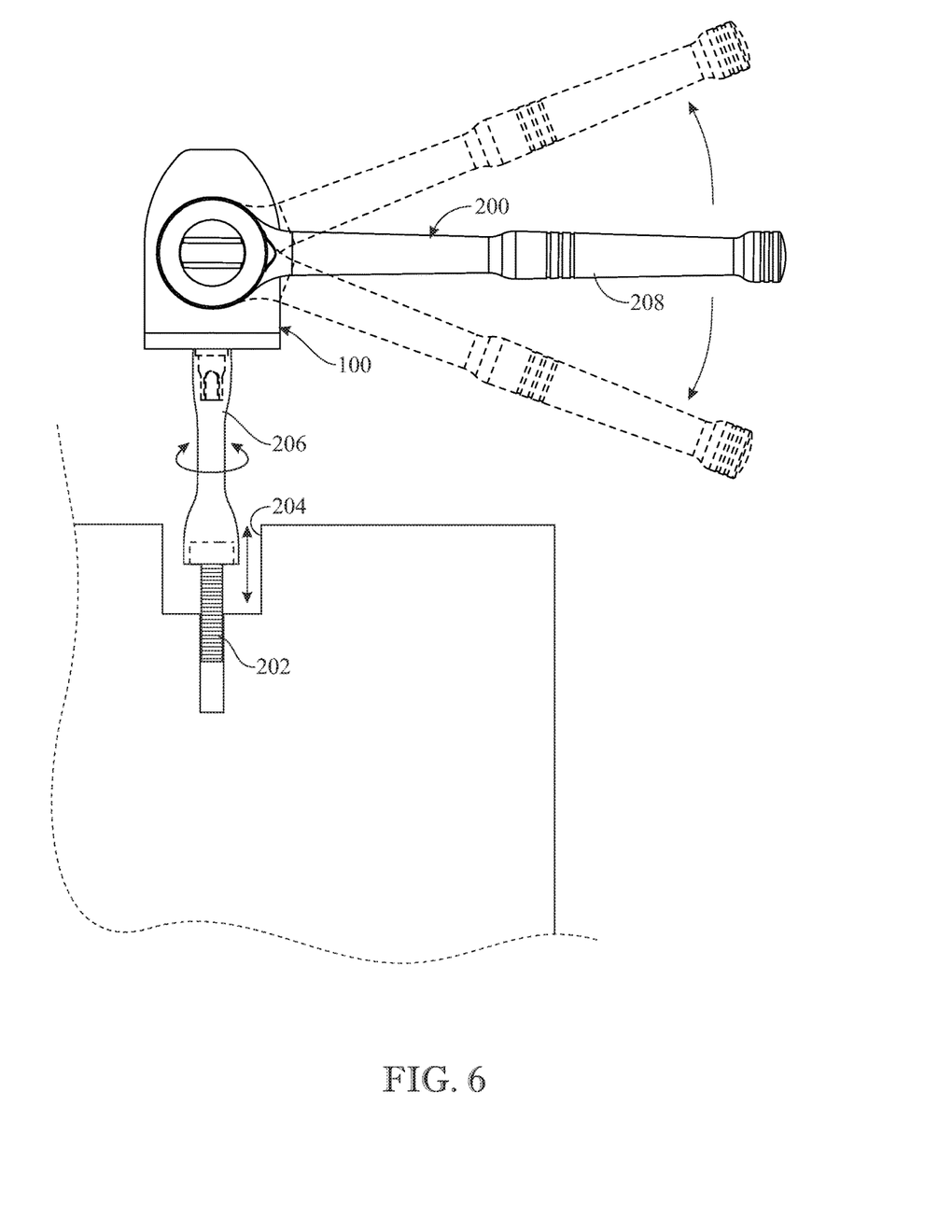
FIG. 6 presents a side elevational view of a socket wrench coupled to the input gear assembly of the apparatus spaced above a bolt disposed in a recess which is connected to an elongated socket extending upward from the recess and interconnecting the output gear assembly of the apparatus to the bolt.
Figure 7:
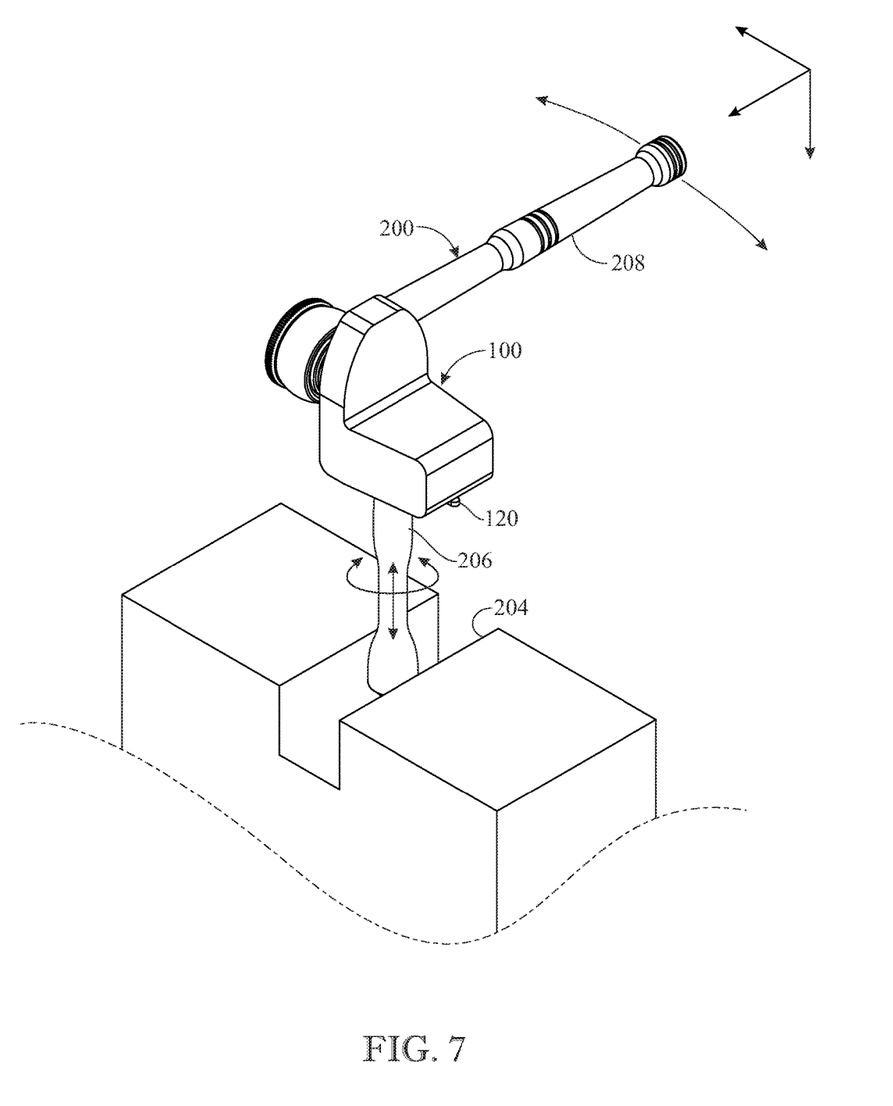
FIG. 7 presents an upper isometric view of the apparatus deployed in the environment shown in FIG. 6, now illustrating the socket wrench moved in an angular direction orthogonal to the angular direction of movement of the socket wrench in FIG. 6.
Figure 8:
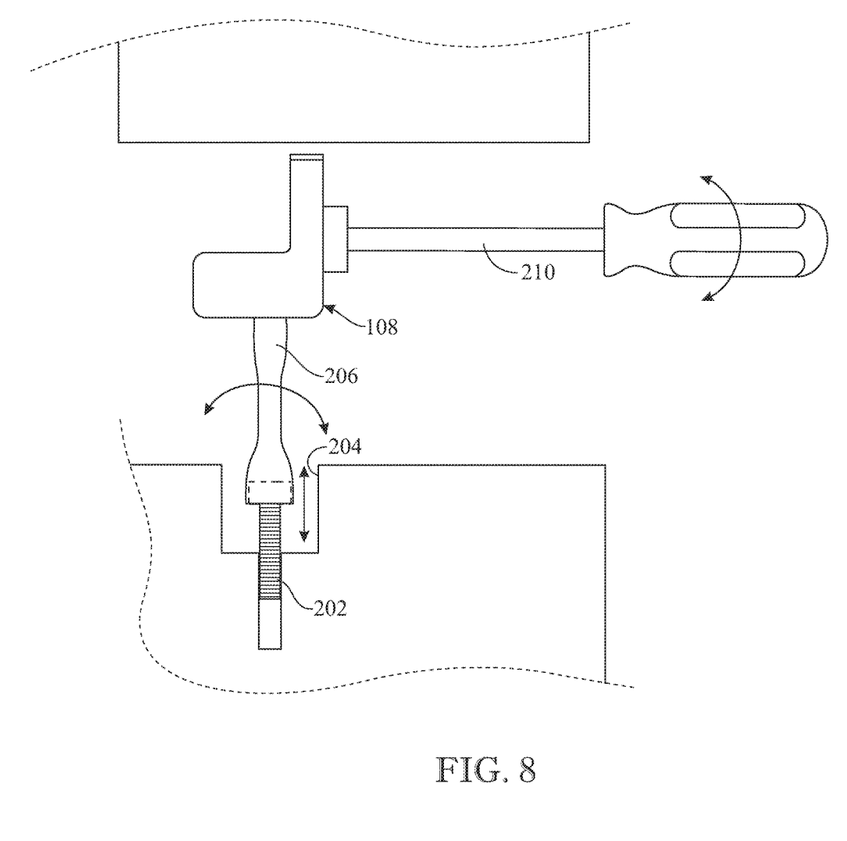
FIG. 8 presents a side elevational view similar to that of FIG. 6, now illustrating the socket wrench replaced by a socket screwdriver.
Figure 9:
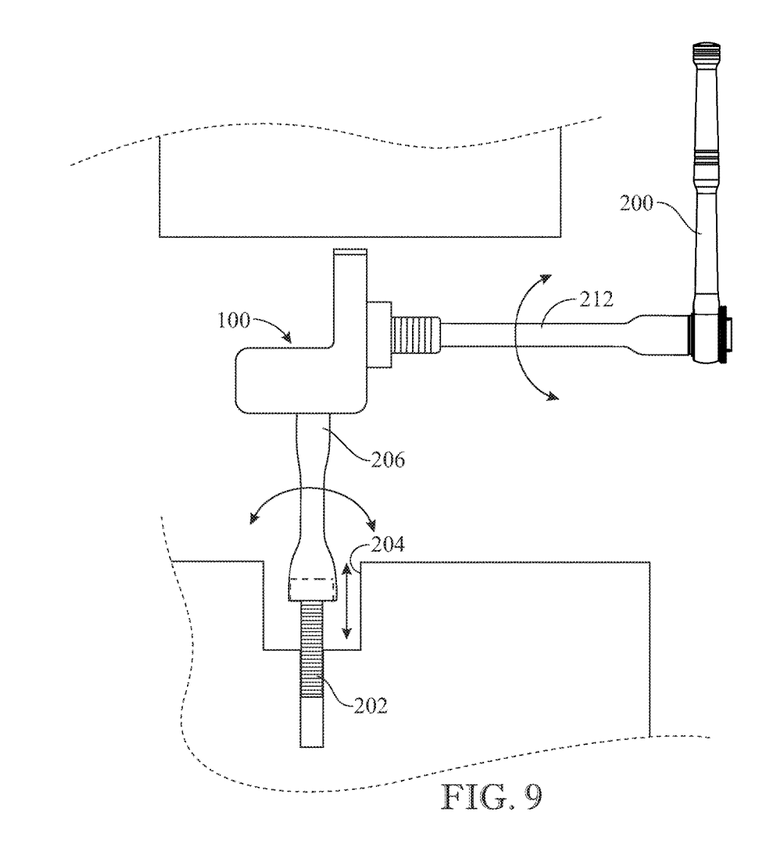
FIG. 9 presents a side elevational view similar to that of FIG. 8, now illustrating the socket screwdriver replaced by a socket wrench and an elongated socket.

Turning now to FIGS. 6-9, different wrenches and adapters are shown that are used by the wrench rotational axis re-positioning apparatus 100. FIG. 6 shows a socket wrench 200 coupled to the input shaft of the input gear assembly of the apparatus 100 being spaced above a bolt 202 disposed in a recess 204. The bolt 202 is connected via an elongated socket 206 extending upward from the recess and interconnecting the output gear assembly of the apparatus 100 to the bolt. The vertical, up-and-down, movement of the handle 208 of the socket wrench 200 applies the multiplication function to rotate and remove the bolt 202 faster wherein both the input and output bevel gears are being rotated. FIG. 7 shows the apparatus 100 still deployed in the environment shown in FIG. 6, but now illustrating the socket wrench 206 moved in a horizontal, left and right, movement that is used to overcome an initial tight condition of the bolt 202. The lever 120 of the ratcheting mechanism is set such that the input and output bevel gears do not rotate. Once the initial tight condition is loosen or overcome, the handle 208 is returned to vertical, up-and-down, movement. Unlike other devices, the apparatus 100 allows for the rotational and translational movement of the handle 208 of the socket wrench or lever 120. FIG. 8 shows the apparatus 100 in a similar environment to that shown in FIG. 6, but now illustrating the socket wrench 200 replaced by a socket screwdriver 210. FIG. 9 shows an environment similar to that of FIG. 8, but now illustrating the socket screwdriver 210 replaced by the socket wrench 200 and another elongated socket 212.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A wrench rotational axis re-positioning apparatus, comprising:
    a housing comprising contiguous first and second housing portions,
    said first housing portion comprising a front side exterior panel and a back side exterior panel in parallel, spaced-apart relationship with said front side panel, the front and back side exterior panels partially defining a first housing interior cavity space therebetween, said front side exterior panel having a circular aperture extending completely therethrough and surrounded by a cylindrical bearing wall extending outwardly from an exterior surface of said front side exterior panel, said back side exterior panel having a circular aperture extending completely therethrough, said front side exterior panel aperture and said back side exterior panel aperture concentric about a common first axis;
    said second housing portion comprising a bottom side exterior panel and a top side exterior panel in a parallel, spaced-apart relationship with said bottom side exterior panel, the bottom and top side exterior panels partially defining a second housing interior cavity space therebetween, said bottom side exterior panel having a circular aperture extending completely therethrough and said top side exterior panel having a circular aperture extending completely therethrough, said bottom side exterior panel aperture and said top side exterior panel aperture concentric about a common second axis,
    said top side exterior panel contiguous with said back side exterior panel and oriented along a top side exterior panel plane perpendicular to a respective back side exterior panel plane,
    said front side exterior panel contiguous with said bottom side exterior panel and oriented along a front side exterior panel plane perpendicular to a respective bottom side exterior panel plane,
    an input gear assembly in the form of a contiguous input shaft having a cylindrical front portion transitioning to a reduced-diameter cylindrical middle portion, the input gear assembly having an input fitting at an input gear assembly first end along an input gear rotational axis, a cylindrical rear end portion at an input gear assembly second end along said input gear rotational axis, and an input bevel gear having a central bore disposed about an exterior surface of the reduced-diameter cylindrical middle portion of said input shaft, such that the cylindrical front portion, the reduced-diameter cylindrical middle portion, the input fitting, and the cylindrical rear end portion of the contiguous input shaft are all concentric about said input gear rotation axis, the cylindrical rear end portion extending into and supported within the back side aperture, the cylindrical middle portion extending completely through the front side aperture such that an exterior surface thereof is supported within both the front side aperture and an interior surface of the cylindrical bearing wall extending outwardly from the exterior surface of the front side exterior panel, said input bevel gear disposed within the first housing interior cavity space; and
    an output gear assembly in the form of a contiguous output shaft having a cylindrical bottom end portion transitioning in a first direction to a reduced-diameter cylindrical middle portion terminating at an output shaft cylindrical top end portion, said output shaft cylindrical bottom end portion transitioning in an opposite second direction into the form of an output fitting, an output bevel gear having a central bore defining a central bore interior peripheral sidewall disposed about an exterior surface of the output shaft cylindrical middle portion, a ratchet gear having a central aperture defining a central aperture interior peripheral sidewall disposed about said exterior surface of the output shaft cylindrical middle portion, the ratchet gear interposed between the output bevel gear and the cylindrical bottom end portion of the output shaft, such that the output shaft cylindrical middle portion, cylindrical bottom end portion, cylindrical top end portion, and the output fitting are all concentric about an output gear second axis, the output shaft cylindrical top end portion extending into and supported within the second housing portion top side aperture, and the output shaft cylindrical bottom end portion extending completely through the bottom side aperture such that an exterior surface thereof is supported within the bottom side aperture, said output bevel gear disposed within the second housing portion interior cavity space, wherein said input bevel gear and said output bevel gear are in mesh contact with one another.

2. The apparatus of claim 1, further comprising:
    a ratcheting mechanism mounted to said housing, said ratcheting mechanism having an actuating lever extending exteriorly of said housing from said housing interior cavity space, wherein said actuating lever is configured to toggle between a first orientation and a second orientation, such that when said actuating lever is positioned into said first orientation said ratcheting mechanism enables said output gear assembly to rotate in a first rotational direction about said output gear rotation axis, and when said actuating lever is positioned into said second orientation said ratcheting mechanism enables said output gear assembly to rotate in a second rotational direction, opposite said first rotational direction, about said output gear rotation axis.

3. The apparatus of claim 1, wherein said input fitting further comprises a female input fitting.

4. The apparatus of claim 2, wherein said ratcheting mechanism is contained within said housing interior cavity space except for the actuating lever of said ratcheting mechanism.

5. The apparatus of claim 1, wherein said output fitting further comprises a male output fitting.

6. The apparatus of claim 1, wherein a said input bevel gear has an input bevel gear diameter and said output bevel gear has an output bevel gear diameter, said input bevel gear diameter greater than said output bevel gear diameter thereby creating faster rotation speed of said output bevel gear vis-à-vis corresponding rotation speed of said input gear.

7. The apparatus of claim 2, wherein said ratcheting mechanism further comprises:
   a ratchet gear affixed to said output gear assembly and rotatable therewith about said second axis, said ratchet gear having a contiguous peripheral row of teeth projecting outward with respect to said second axis;
   a pair of spaced apart pawls having respective first ends engageable with said contiguous peripheral row of teeth of said ratchet gear and respective second ends pivotally mounted to said housing remote from said ratchet gear to enable pivotal movement of said pawls into and out of engagement with said contiguous peripheral row of teeth of said ratchet gear, such that the respective first ends of said pair of spaced-apart pawls, when engaged therewith prevent rotation of said ratchet gear, and said output gear assembly therewith, in a first one of said opposite first and second rotational directions, while enabling rotation of said ratchet gear, and said output gear assembly therewith, in a second one of said first and second opposite rotational directions; and
   a pair of springs each extending between a respective one of said pair of spaced-apart pawls and a respective one of two opposing locations on said housing so as to bias said pawls toward engagement of said first ends thereof with said contiguous peripheral row of teeth of said ratchet gear;
   wherein said actuating lever is pivotally mounted at one end thereof to said housing and has a cam element proximate said one end being located within said interior cavity of said housing between and in contact with said pawls between said first and second ends thereof, and wherein said actuating lever at an opposite end thereof extends from said interior cavity to a location exterior of said housing, thereby enabling said manipulation of said actuating lever to pivot said cam element and thereby pivotally move said pair of spaced-apart pawls to a first one of said first and second orientations such that only one of said pawls, at said first end thereof, engages said contiguous peripheral row of teeth of said ratchet gear.

8. The apparatus of claim 1, wherein said first housing portion has a first central plane having a first central plane defining a first central plane orientation and said second housing portion has a respective second central plane defining a second central plane orientation, wherein said first central plane orientation is perpendicular to said second central plane orientation.

* * * * *